United States Patent
Xiong et al.

(10) Patent No.: US 10,554,122 B1
(45) Date of Patent: Feb. 4, 2020

(54) LOW LOSS VOLTAGE FEEDBACK METHOD FOR POWER FACTOR CORRECTION CIRCUITS

(71) Applicant: Universal Lighting Technologies, Inc., Madison, AL (US)

(72) Inventors: Wei Xiong, Madison, AL (US); Dane Sutherland, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 16/387,062

(22) Filed: Apr. 17, 2019

Related U.S. Application Data

(60) Provisional application No. 62/691,651, filed on Jun. 29, 2018.

(51) Int. Cl.
| | | |
|---|---|---|
| *H02M 1/42* | (2007.01) | |
| *H02M 1/44* | (2007.01) | |
| *H02M 1/32* | (2007.01) | |
| H02M 1/00 | (2006.01) | |

(52) U.S. Cl.
CPC .......... *H02M 1/4225* (2013.01); *H02M 1/32* (2013.01); *H02M 1/44* (2013.01); *H02M 2001/0009* (2013.01)

(58) Field of Classification Search
CPC ........ H02M 1/32; H02M 1/42; H02M 1/4225; H02M 1/4258; H02M 1/4275; H02M 1/44; H02M 2001/0009
See application file for complete search history.

(56) References Cited

U.S. PATENT DOCUMENTS

| | | | | |
|---|---|---|---|---|
| 5,489,837 A | * | 2/1996 | Arakawa ............ | H02M 1/4225 323/207 |
| 6,396,717 B2 | * | 5/2002 | Yasumura ........... | H02M 1/4241 363/21.02 |
| 8,184,455 B2 | * | 5/2012 | Chen ...................... | H02M 1/10 323/207 |

(Continued)

OTHER PUBLICATIONS

STMicroelectronics, Flyback Converters with the L6561 PFC Controller, AN1060 Application Note, Jan. 2003, 11 pages.

(Continued)

*Primary Examiner* — Matthew V Nguyen
(74) *Attorney, Agent, or Firm* — Patterson Intellectual Property Law, P.C.; Gary L. Montle; Jerry Turner Sewell

(57) ABSTRACT

A voltage feedback circuit for a power factor correction circuit couples an output voltage to a voltage feedback input terminal of the power factor correction circuit. The voltage feedback circuit includes a first voltage sensing resistor, a second voltage sensing resistor and a third voltage sensing resistor. A stabilization capacitor is connected across the third voltage sensing resistor. During a normal mode of operation, a feedback voltage has a magnitude determined by the first, second and third voltage sensing resistors. When the output voltage increases rapidly, the stabilization capacitor bypasses the increased voltage around the third voltage sensing resistor to cause the magnitude of the feedback voltage to be determined by only the first and second voltage sensing resistors. The power factor correction circuit detects a transient overvoltage condition at a lower output voltage than if the third voltage sensing resistor were not bypassed.

11 Claims, 5 Drawing Sheets

(56) References Cited

U.S. PATENT DOCUMENTS

| | | | |
|---|---|---|---|
| 10,320,303 B1* | 6/2019 | Xiong | H02M 1/4225 |
| 2010/0014326 A1* | 1/2010 | Gu | H02M 1/14 |
| | | | 363/45 |
| 2010/0202169 A1* | 8/2010 | Gaboury | H02M 1/4225 |
| | | | 363/49 |

OTHER PUBLICATIONS

STMicroelectronics, "L6561, Enhanced Transition Mode Power Factor Corrector," AN966 Application Note, Mar. 2003, 21 pages.

STMicroelectronics, "Power Factor Corrector," L6561, Jun. 2004, 13 pages.

\* cited by examiner

LOW LOSS VOLTAGE FEEDBACK METHOD FOR POWER FACTOR CORRECTION CIRCUITS

CROSS-REFERENCE TO RELATED APPLICATION

This application claims the benefit under 35 USC. § 119(e) of U.S. Provisional Application No. 62/691,651, filed Jun. 29, 2018, entitled "Low Loss Voltage Feedback Method for PFC Circuits," which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present disclosure relates generally to two-stage power supply circuits having a power factor correction circuit as a first stage and a DC-DC converter as a second stage.

BACKGROUND

A typical power supply circuit receives power from an AC source. During a normal mode of operation, the power supply circuit generates either a constant voltage or a constant current to a DC load. The power supply circuit includes a first-stage power factor correction circuit that operates to maintain the current drawn from the AC source substantially in phase with the voltage of the AC source. The power factor correction circuit provides a first-stage output voltage to a second-stage DC-to-DC converter circuit. The second-stage DC-to-DC converter circuit generates the constant voltage or the constant current for the DC load.

The typical power supply circuit has a standby mode of operation in which the power supply circuit remains connected to the AC source but does not provide power to a load. The power supply circuit continues to dissipate power even when no power is being provided to the load. For example, the power factor correction circuit includes a resistive feedback circuit from the first-stage output to a feedback input terminal. The resistive feedback circuit dissipates power even when the power supply circuit is in the standby mode. The same resistive feedback circuit is also integral to the operation of an overvoltage detection function of the power factor correction circuit.

The power dissipated by the resistive feedback circuit can be reduced by increasing the resistance of a portion of the resistive feedback circuit; however, increasing the resistance in a conventional manner increases the magnitude of a threshold overvoltage detectable by the overvoltage detection function. Accordingly, increasing the resistance in a conventional manner is not a desirable technique for reducing the power dissipation of the resistive feedback circuit.

SUMMARY

A need exists for a two-stage power supply circuit that has a low power consumption in a standby mode and in a normal steady-state mode, and that maintains an overvoltage protection threshold at a reasonably low voltage level.

One aspect in accordance with the embodiments disclosed herein is a voltage feedback circuit for a power factor correction circuit. The voltage feedback circuit couples an output voltage to a voltage feedback input terminal of the power factor correction circuit. The voltage feedback circuit includes a first voltage sensing resistor, a second voltage sensing resistor and a third voltage sensing resistor. A stabilization capacitor is connected across the third voltage sensing resistor. During a normal mode of operation, a feedback voltage has a magnitude determined by the first, second and third voltage sensing resistors. When the output voltage increases rapidly, the stabilization capacitor bypasses the increased voltage around the third voltage sensing resistor to cause the magnitude of the feedback voltage to be determined by only the first and second voltage sensing resistors. The power factor correction circuit detects a transient overvoltage condition at a lower output voltage than if the third voltage sensing resistor were not bypassed.

Another aspect in accordance with the embodiments disclosed herein is a voltage feedback circuit for a power factor correction circuit. The power factor correction circuit has a voltage feedback input terminal connected to an overvoltage detection circuit. The power factor correction circuit produces an output voltage on an output node. The output voltage is referenced to a voltage reference node. The voltage feedback circuit comprises a first voltage sensing resistor having a first terminal and a second terminal. The first terminal of the first voltage sensing resistor is connected to the output node. A second voltage sensing resistor has a first terminal and a second terminal. The second terminal of the second voltage sensing resistor is connected to the voltage reference node. A third voltage sensing resistor has a first terminal and a second terminal. The first terminal of the third voltage sensing resistor is connected to the second terminal of the first voltage sensing resistor. The second terminal of the third voltage sensing resistor is connected to the first terminal of the second voltage sensing resistor and to the voltage feedback input terminal of the power factor correction circuit. A stabilization capacitor has a first terminal and a second terminal. The first terminal of the stabilization capacitor is connected to the second terminal of the first voltage sensing resistor and to the first terminal of the third voltage sensing resistor. The second terminal of the stabilization capacitor is connected to the second terminal of the third voltage sensing resistor and to the voltage feedback input terminal of the power factor correction circuit.

In certain embodiments in accordance with this aspect, the power factor control circuit maintains a voltage on the feedback input terminal at a fixed voltage. The first voltage sensing resistor has a first resistance, the second voltage sensing resistor has a second resistance, and the third voltage sensing resistor has a third resistance. The ratio of the value of the second resistance to the total of the first resistance, the second resistance and the third resistance is selected such that the voltage on the feedback input terminal has a magnitude equal to the fixed voltage when the output voltage of the power factor correction circuit on the output node has a selected output voltage magnitude. The total of the first resistance and the third resistance is selected to maintain a total power dissipation of the first voltage sensing resistor and the third voltage sensing resistor at a magnitude no more than a maximum power dissipation magnitude. The stabilization capacitor has a capacitance selected to effectively bypass the third voltage sensing resistor when a rapidly changing voltage overshoot occurs such that a current caused by the voltage overshoot is coupled from the output node to the voltage feedback terminal of the power factor correction circuit via the first voltage sensing resistor and the stabilization capacitor.

In certain embodiments in accordance with this aspect, the resistance of the first voltage sensing resistor has a magnitude R1. The power factor correction circuit is coupled to an AC source operating at a frequency $f_{LINE}$. The stabilization capacitor has a capacitance with a magnitude C1. The capacitance of the stabilization capacitor is selected such that:

$$C1 \times R1 > 2/f_{LINE}.$$

In certain embodiments in accordance with this aspect, the power factor correction circuit includes an overvoltage protection circuit. The overvoltage protection circuit is responsive to the magnitude of the voltage on the voltage feedback terminal to cease operation of the power factor correction circuit when the voltage on the voltage feedback terminal exceeds an overvoltage threshold voltage. The first resistance and the second resistance are selected to cause the voltage on the voltage feedback terminal to exceed the overvoltage threshold voltage when the output voltage exceeds a selected maximum magnitude when the rapidly changing voltage overshoot occurs.

Another aspect in accordance with the embodiments disclosed herein is a method for providing a feedback voltage in a power factor correction circuit. The power factor correction circuit has a voltage output node, a ground reference and a voltage feedback input terminal. The method comprises connecting a first voltage sensing resistor, a second voltage sensing resistor and a third voltage sensing resistor in series between the voltage output node and the ground reference of the power factor correction circuit. Connecting the first, second and third voltage sensing resistors in series comprises connecting the first voltage sensing resistor between the voltage output node and the third voltage sensing resistor; connecting the third voltage sensing resistor between the first voltage sensing resistor and a voltage sensing node; and connecting the second voltage sensing resistor between the voltage sensing node and the ground reference. The method further comprises connecting the voltage sensing node to the voltage feedback input of the power factor correction circuit; and connecting a stabilization capacitor across the third voltage sensing resistor between the first voltage sensing resistor and the voltage sensing node.

In certain embodiments in accordance with this aspect, the first, second and third voltage sensing resistors and the stabilization capacitor comprise a voltage sensing circuit. In a normal mode of operation in which the power factor correction circuit actively controls an output voltage ($V_{OUT}$) on the voltage output node, a sensed voltage ($V_{SENSE}$) on the voltage sensing node is determined by the output voltage ($V_{OUT}$), by a first resistance (R1) of the first voltage sensing resistor, by a second resistance (R2) of the second voltage sensing resistor and by a third resistance (R3) of the third voltage sensing resistor in accordance with the following relationship:

$$V_{SENSE} = V_{OUT} \times \frac{R2}{R1 + R2 + R3}.$$

In a transient mode of operation in which the output voltage ($V_{OUT}$) increases rapidly to an overvoltage state in response to a transient condition, the stabilization capacitor bypasses the third voltage sensing resistor such that the sensed voltage ($V_{SENSE}$) is determined by the following relationship:

$$V_{SENSE} = V_{OUT} \times \frac{R2}{R1 + R2}.$$

In the transient mode of operation, the power factor correction circuit is responsive to the sensed voltage ($V_{SENSE}$) to respond to the overvoltage of the output voltage ($V_{OUT}$) at a lower magnitude than in the normal mode of operation.

In certain embodiments in accordance with this aspect, the method operates in a standby mode of operation in which the power factor correction circuit is not controlling the output voltage ($V_{OUT}$). The output voltage has a magnitude ($V_{RMS}$) determined by a rectified AC input voltage. The first voltage sensing resistor and the third voltage sensing resistor dissipate power ($P_{STANDBY}$) in accordance with the following relationship:

$$P_{STANDBY} = 2 \times \frac{(V_{RMS})^2}{R1 + R3}.$$

In certain embodiments in accordance with this aspect, the resistance of the first voltage sensing resistor has a magnitude R1. The power factor correction circuit is coupled to an AC source operating at a frequency $f_{LINE}$. The stabilization capacitor has a capacitance with a magnitude C1. The capacitance of the stabilization capacitor is selected such that:

$$C1 \times R1 > 2/f_{LINE}.$$

Another aspect in accordance with the embodiments disclosed herein is a method for controlling a power factor correction circuit. The power factor correction circuit has a voltage output node, a ground reference and a voltage feedback input terminal. The method comprises applying an output voltage ($V_{OUT}$) on the output node to a voltage sensing circuit comprising a first voltage sensing resistor, a second voltage sensing resistor, a third voltage sensing resistor and a stabilization capacitor. The voltage sensing resistor and the third voltage sensing resistor are connected in series between the voltage output node and a voltage sensing node. The second voltage sensing resistor is connected between the voltage sensing node and the ground reference. The stabilization capacitor is connected across the third voltage sensing resistor. The method further comprises developing a sensed voltage ($V_{SENSE}$) on the voltage sensing node. The sensed voltage is responsive to the output voltage on the output node in two modes of operation. In a steady-state mode of operation, the sensed voltage on the voltage sensing node is responsive to a first resistance (R1) of the first voltage sensing resistor, a second resistance (R2) of the second voltage sensing resistor and a third resistance (R3) of the third voltage sensing resistor in accordance with the following:

$$V_{SENSE} = V_{OUT} \times \frac{R2}{R1 + R2 + R3}.$$

In a transient mode of operation, the stabilization capacitor couples rapid voltage changes from the first voltage sensing resistor to the voltage sensing node, and the feedback voltage on the voltage sensing node is responsive to the first resistance of the first voltage sensing resistor and the second resistance of the second voltage sensing resistor in accordance with the following:

$$V_{SENSE} = V_{OUT} \times \frac{R2}{R1+R2}.$$

In certain embodiments in accordance with this aspect, the method operates in a standby mode of operation in which the power factor correction circuit is not controlling the output voltage. The output voltage has a magnitude ($V_{RMS}$) determined by a rectified AC input voltage. The first voltage sensing resistor and the third voltage sensing resistor dissipate power ($P_{STANDBY}$) in accordance with the following relationship:

$$P_{STANDBY} = 2 \times \frac{(V_{RMS})^2}{R1+R3}.$$

In certain embodiments in accordance with this aspect, the power factor correction circuit is coupled to an AC source operating at a frequency $f_{LINE}$. The stabilization capacitor has a capacitance with a magnitude C1. The capacitance of the stabilization capacitor is selected such that:

$C1 \times R1 > 2/f_{LINE}.$

BRIEF DESCRIPTIONS OF THE SEVERAL VIEWS OF THE DRAWINGS

Figure 1:
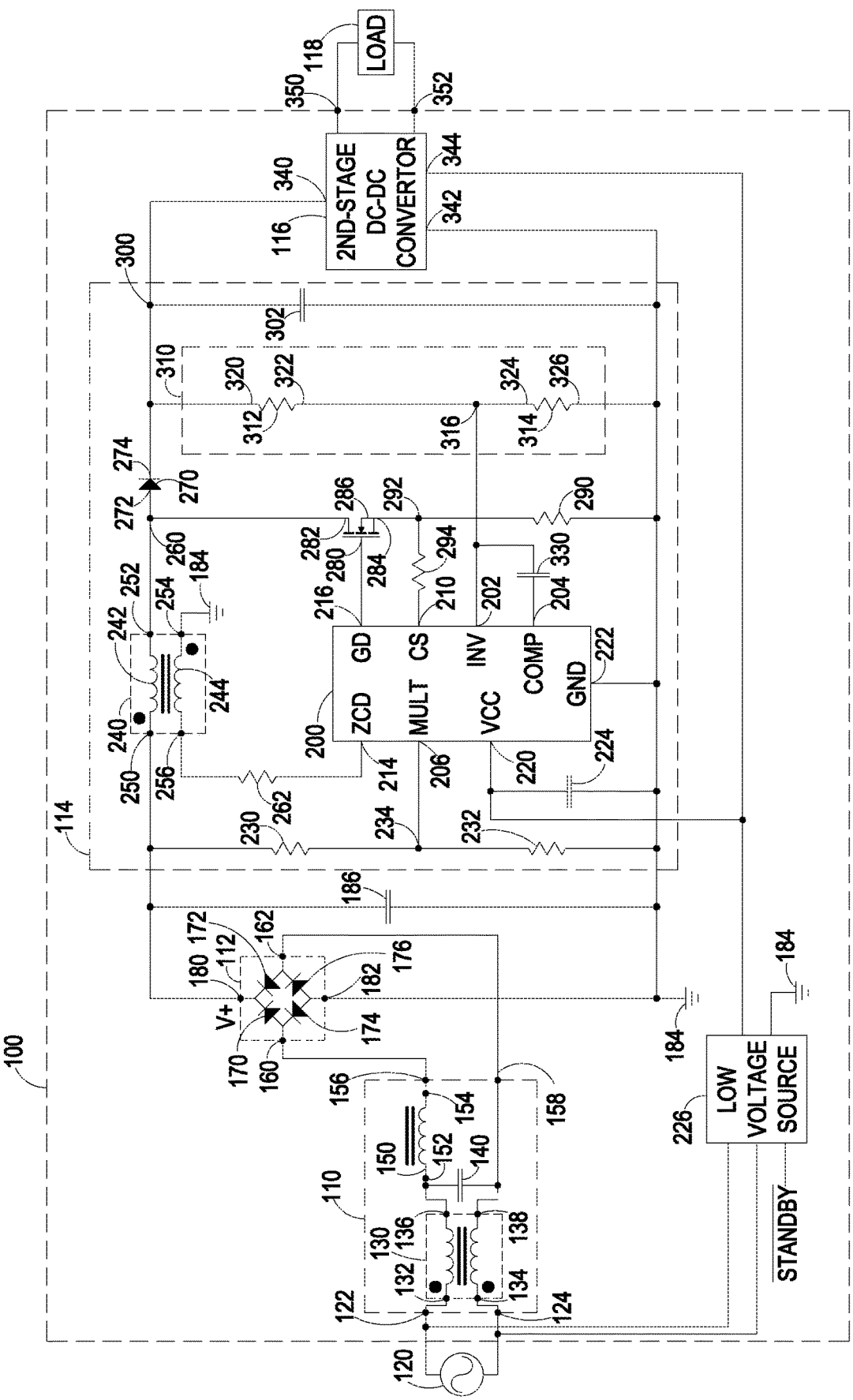
FIG. 1 illustrates a topology of a typical conventional two-stage electronic switching power supply.
Figure 5:
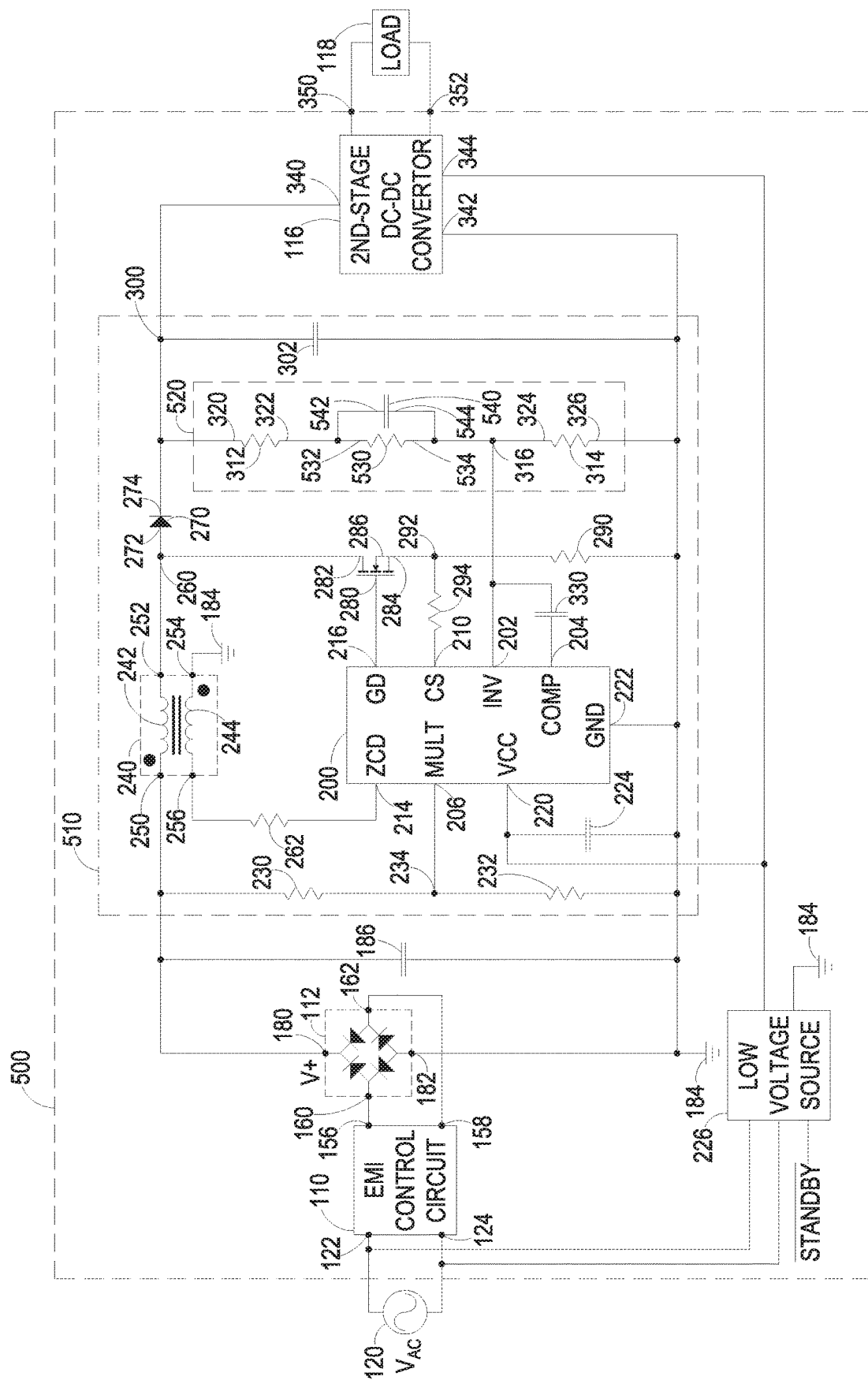

FIG. 5 an improved version of the two-stage electronic switching power supply of FIG. 1 in which a third voltage sensing resistor is included in the voltage sensing circuit between the first voltage sensing resistor and the voltage sensing node and in which a stabilization capacitor is connected across the third voltage sensing resistor.

Figure 6:
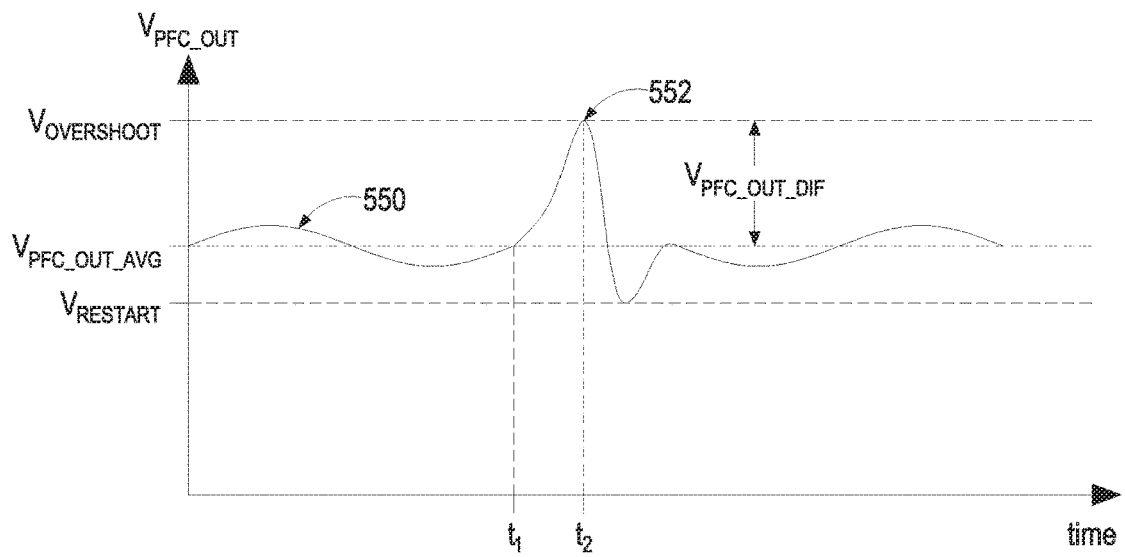

FIG. 6 illustrates a waveform of output voltage ($V_{PFC\_OUT}$) from the power factor correction circuit of FIG. 5.

Figure 7:
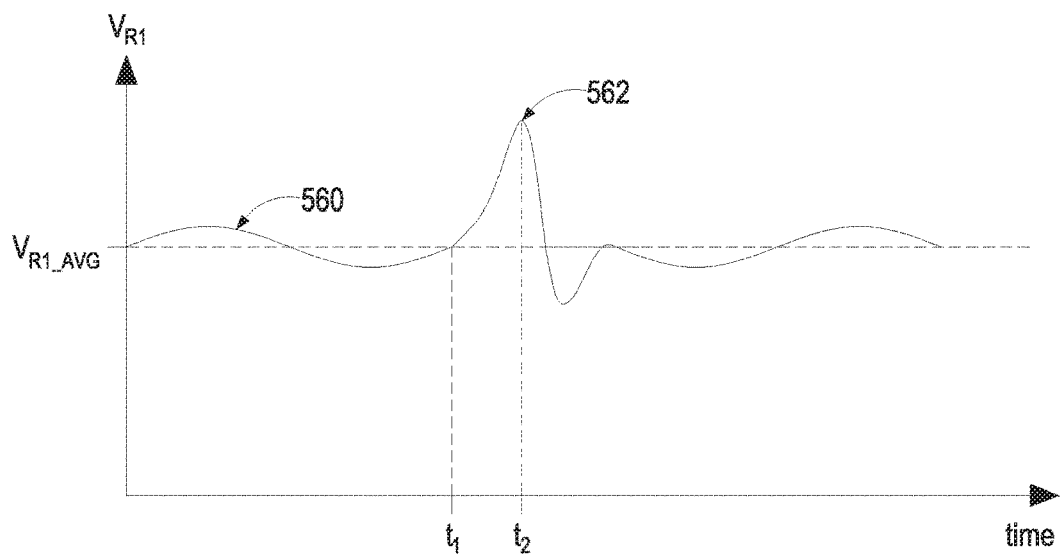

FIG. 7 illustrates a waveform of a voltage ($V_{R1}$) that appears across the first voltage sensing resistor of the voltage sensing circuit of FIG. 5.

Figure 8:
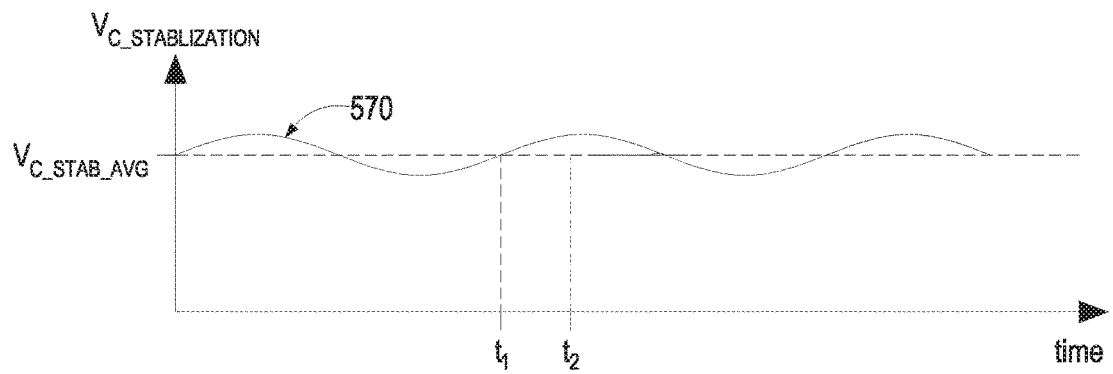

FIG. 8 illustrates a waveform of a ripple voltage ($V_{C\_STABILAZATION}$) that appears across the stabilization capacitor of the voltage sensing circuit of FIG. 5.

DETAILED DESCRIPTION

The following detailed description of embodiments of the present disclosure refers to one or more drawings. Each drawing is provided by way of explanation of the present disclosure and is not a limitation. Those skilled in the art will understand that various modifications and variations can be made to the teachings of the present disclosure without departing from the scope of the disclosure. For instance, features illustrated or described as part of one embodiment can be used with another embodiment to yield a still further embodiment.

The present disclosure is intended to cover such modifications and variations as come within the scope of the appended claims and their equivalents. Other objects, features, and aspects of the present disclosure are disclosed in the following detailed description. One of ordinary skill in the art will understand that the present discussion is a description of exemplary embodiments only and is not intended as limiting the broader aspects of the present disclosure.

FIG. 1 illustrates a topology of a typical conventional two-stage electronic switching power supply 100. The power supply includes four general blocks—an EMI control circuit 110, a rectifier circuit 112, a first-stage circuit 114 and a second-stage circuit 116. As described below, the first-stage circuit is a power factor correction (PFC) circuit. In the illustrated embodiment, the second stage circuit is a DC-DC convertor circuit. The second-stage circuit provides power to a DC load 118, which may be, for example, a plurality of interconnected light-emitting diodes (LEDs).

An AC source 120 provides AC power across a first (line) input 122 and a second (neutral) input 124 of the EMI control circuit 110. In particular, the line input is connected to a conventional line conductor of the AC source, and the neutral input is connected to a conventional neutral conductor of the AC source. The connections may be accomplished by hardwiring connections to the AC source or by inserting an AC plug into an AC outlet.

The EMI control circuit 110 comprises a common mode EMI choke 130 having a first input 132 connected to the line input 122 from the AC source 120 and having a second input 134 connected to the neutral input 124 from the source. The common mode EMI choke has a first output 136 and a second output 138. An X-type EMI filter capacitor 140 is connected between the first output and the second output of the common mode EMI choke. The first output of the common mode EMI choke is connected to a first terminal 152 of a differential mode EMI inductor 150. A second terminal 154 of the differential mode EMI inductor is connected to a first EMI circuit output terminal 156. The second output of the common mode EMI choke is connected to a second EMI circuit output terminal 158.

The AC power passes through the EMI control circuit 110 and is provided across a first input terminal 160 and a second input terminal 162 of the rectifier circuit 112. The rectifier circuit is configured as a full-wave bridge rectifier circuit that comprises a first rectifier diode 170, a second rectifier diode 172, a third rectifier diode 174, and a fourth rectifier diode 176, which are connected as shown.

The first input terminal 160 of the rectifier circuit 112 is connected to the anode of the first rectifier diode 170 and to the cathode of the third rectifier diode 174. The second input terminal 162 of the rectifier circuit is connected to the anode of the second rectifier diode 172 and to the cathode of the fourth rectifier diode 176.

The cathodes of the first rectifier diode 170 and the second rectifier diode 172 are commonly connected to a positive voltage (V+) output terminal 180 of the rectifier circuit 112. The anodes of the third rectifier diode 174 and the fourth rectifier diode 176 are commonly connected to a reference voltage output terminal 182, which is connected to a local circuit ground connection 184. A rectifier output filter capacitor 186 is connected between the positive voltage output terminal and the reference voltage output terminal of the rectifier circuit. The rectifier circuit generates a full-wave rectified output voltage across the rectifier output filter capacitor in a conventional manner.

The first-stage circuit ("PFC circuit") 114 in FIG. 1 is configured as a boost converter operating in the critical conduction mode. The PFC circuit includes a power factor corrector integrated circuit (PFC IC) 200. In the illustrated embodiment, the PFC IC comprises an L6561 PFC IC, which is commercially available from STMicroelectronics of Geneva, Switzerland. Other power factor corrector integrated circuits from the same manufacturer or from other manufacturers may also be incorporated into the PFC circuit.

The PFC IC 200 includes an inverting (INV) input 202 connected to an internal error amplifier, a compensation (COMP) output 204 connected to an output of the internal error amplifier, a multiplier (MULT) input 206 connected to an internal multiplier stage, a current sensing (CS) input 210 connected to an internal comparator of an internal control loop, a zero current detection (ZCD) input 214 connected to an internal zero current detector, and a gate driver (GD) output 216 connected to an internal push-pull output stage.

The PFC IC 200 further includes a supply voltage (VCC) input 220 that provides power to the IC. A ground return (GND) output 222 completes the power connection and provides a ground reference for signals received and generated by the IC. A voltage buffer capacitor 224 is connected between the supply voltage input and the ground return output. The supply voltage input is connected to a low voltage source 226 that provides the DC voltage for the operation of the PFC IC. In the illustrated embodiment, the low voltage source receives AC power from the AC source 120. In other embodiments, the low voltage source may be coupled to receive the rectified DC voltage produced by the rectifier circuit 112. For example, the low voltage source may include a linear voltage regulator that provides a substantially constant DC voltage over a wide range of input voltages.

The low voltage source 226 is controlled by a "standby" signal, which is an active low signal as indicated by the overline (e.g., $\overline{\text{STANDBY}}$) in FIG. 1. When the standby signal is inactive (e.g., a high voltage), the low voltage source is on and provides the supply voltage to the PFC IC 200. When the standby signal is active (e.g., a low voltage), the low voltage source turns off the supply voltage to the PFC IC. The standby signal may be activated to turn off the supply voltage and save energy when the current provided to the load 118 is not necessary. For example, when the load is an LED light source, the standby signal may be activated to turn off the illumination provided by the LED light source is not needed.

As further shown in FIG. 1, the PFC circuit 114 further includes a first input voltage divider resistor 230 and a second input voltage divider resistor 232 connected in series between the positive reference voltage output terminal 180 from the rectifier circuit 112 and the local circuit ground connection 184. The two resistors are connected at a common node 234 to provide a voltage proportional to the time-varying output voltage from the rectifier circuit. The common node is connected to the multiplier (MULT) input 206 of the PFC IC 200, which uses the input signal to control the timing of output signals to thereby control the power factor.

The PFC circuit 114 further includes a boost inductor 240 having a main winding 242 and an auxiliary winding 244. The main winding has a first terminal 250 and a second terminal 252. The auxiliary winding has a first terminal 254 and a second terminal 256. As noted by the dot convention on the windings, the two windings are mutually coupled, and the respective first terminals of the two windings are in phase.

The first terminal 250 of the main winding of the boost inductor 240 is connected to the positive reference voltage output terminal 180 of the rectifier circuit 112. The second terminal 252 of the main winding of the boost inductor is connected to a boost inductor output node 260. The first terminal 254 of the auxiliary winding 244 of the boost inductor is connected to the local circuit ground connection 184. The second terminal 256 of the auxiliary winding of the boost inductor is connected to a first terminal of a current limiting resistor 262. A second terminal of the current limiting resistor is connected to the zero current detection (ZCD) input 214 of the PFC IC 200. When current is flowing from the second terminal to the first terminal of the main winding to the boost inductor output node, a zero current detection current ($I_{ZCD}$) is induced to flow from the second terminal of the auxiliary winding through the current limiting resistor to the zero current detection (ZCD) input of the PFC IC. Internal circuitry within the PFC IC detects when the current decreases to a sufficiently low value to indicate that current is no longer flowing through the main winding of the boost inductor.

The boost inductor output node 260 is connected to an anode 272 of a PFC circuit output diode 270. The PFC circuit output diode has a cathode 274.

The boost inductor output node 260 is also connected to a drain terminal 282 of an electronic switch 280. In the illustrated circuit, the electronic switch comprises an n-channel enhancement mode metal oxide semiconductor field effect transistor (MOSFET). The electronic switch also has a source terminal 284 and a gate terminal 286. The gate terminal of the electronic switch is connected to the gate drive (GD) output 216 of the PFC IC 200. The source terminal of the electronic switch is connected to a first terminal of a current sensing resistor 290 at a current sensing node 292. A second terminal of the current sensing resistor is connected to the local circuit ground connection 184. The current sensing resistor has a low resistance of, for example, 0.1 ohm such that the current flowing through the current sensing resistor generates a voltage on the current sensing node that is proportional to the magnitude of the current. The voltage generated on the current sensing node is coupled to the current sensing (CS) input 210 of the PFC IC via a current sensing input resistor 294.

The cathode 274 of the PFC circuit output diode 270 is connected to a PFC circuit output node 300 to produce a PFC circuit output voltage ($V_{PFC\_OUT}$). A PFC circuit output filter capacitor 302 is connected between the PFC circuit output node and the local circuit ground connection 184 to filter the power factor output voltage. In the illustrated embodiment, the PFC circuit output filter capacitor is an electrolytic capacitor having a voltage rating of, for example, 500 volts.

The two-stage electronic switching power supply 100 includes a voltage sensing circuit 310 connected across the PFC circuit output filter capacitor 302 between the PFC circuit output node 300 and the local circuit ground connection 184. The voltage sensing circuit includes a first voltage sensing resistor 312 and a second voltage sensing resistor 314, which are connected in series between the PFC circuit output node and the local circuit ground connection. The first voltage sensing resistor is connected between the PFC circuit output node and a voltage sensing node 316. A first terminal 320 of the first voltage sensing resistor is connected to the PFC circuit output node. A second terminal 322 of the first voltage sensing resistor is connected to the voltage sensing node. The second voltage sensing resistor is connected between the voltage sensing node and the local circuit ground reference. A first terminal 324 of the second voltage sensing resistor is connected to the voltage sensing node. A second terminal 326 of the second voltage sensing resistor is connected to the local circuit ground reference.

A sensed voltage ($V_{SENSE}$) is produced on the voltage sensing node 316. The voltage sensing node is connected to the inverting (INV) input 202 of the PFC IC 200 to provide feedback to the PFC IC proportional to the PFC circuit output voltage. The PFC IC is responsive to the sensed voltage at the voltage sensing node to regulate the voltage on the PFC circuit output node. For example, the resistance values of the first voltage sensing resistor 312 and the second voltage sensing resistor 314 are selected to cause the sensed voltage at the voltage sensing node to be 2.5 volts when the PFC circuit output voltage ($V_{PFC\_OUT}$) on the PFC circuit output node has a selected magnitude. If the PFC circuit output voltage increases above the selected magnitude, the PFC IC adjusts the timing of the signal applied to the gate terminal of the electronic switch to reduce the PFC circuit output voltage. If the PFC circuit output voltage decreases below the selected magnitude, the PFC IC adjusts the timing of the signal applied to the gate terminal of the electronic switch to increase the PFC circuit output voltage.

The voltage ($V_{SENSE}$) on the voltage sensing node 316 is determined by the output voltage ($V_{PFC\_OUT}$) in accordance with the following equation:

$$V_{SENSE} = V_{PFC\_OUT} \times \frac{R2}{R1 + R2} \qquad (1)$$

In Equation (1), R1 is the resistance of the first voltage sensing resistor 312 and R2 is the resistance of the second voltage sensing resistor 314

A feedback compensation capacitor 330 is connected between the inverting (INV) input 202 and the compensation (COMP) output 204 of the PFC IC 200. The feedback compensation capacitor is connected as part of an integration control loop of the PFC IC. The integration control loop of the PFC IC operates to stabilize the output voltage on the PFC circuit output node 300.

The operation of the PFC circuit 114 is well known. Basically, the PFC IC 200 controls the timing of the gate voltage of the electronic switch 280 to selectively turn the electronic switch on and off. The PFC IC compares the sensed voltage ($V_{SENSE}$) applied to the inverting (INV) input 202 from the voltage sensing node 316 to an internal reference voltage (e.g., 2.5 volts in the illustrated embodiment). The PFC IC modifies the timing of the gate drive signal from the gate drive (GD) output 216 to maintain the PFC circuit output voltage at a desired voltage level to thereby cause the sensed voltage to be equal to the internal reference voltage. The PFC IC monitors the current through the electronic switch via voltage on the current sensing (CS) input from the current sensing node 292.

The PFC IC controls the electronic switch to control the magnitude of the current to conform with a magnitude envelope corresponding to the time-varying magnitude of the voltage on the multiplier (MULT) input 206. In the critical conduction mode of operation, after the PFC IC turns the electronic switch off, the PFC IC does not turn the electronic switch on until the current is close to zero as determined by the current flowing into the zero current detection (ZCD) input 214.

The output voltage ($V_{PFC\_OUT}$) from the PFC circuit 114 on the PFC circuit output node 300 is provided to a high voltage input terminal 340 of the DC-DC converter circuit 116. The DC-DC converter circuit also has a ground terminal 342 connected to the local circuit ground connection 184. The DC-DC converter circuit also has a component supply voltage terminal 344, which is connected to the output of the low voltage source 226. As noted above, the voltage from the low voltage source may be turned off by activating the "standby" signal.

The DC-DC converter circuit 116 operates in a conventional manner to convert the unregulated DC voltage on the high voltage input terminal 340 to a regulated DC voltage between a first output terminal 350 and a second output terminal 352 to drive the load 118. In an exemplary DC-DC converter circuit for supplying a plurality of LEDs, the DC-DC converter circuit controls the magnitude of the current flowing through the LEDs to maintain a selected illumination level of the LEDs in the load. For example, the DC-DC converter in the illustrated embodiment may be a switch-mode power supply, which is configured to provide a substantially constant current to the load. The switch-mode power supply operates by generating a high frequency switched DC signal having a variable duty cycle or a variable pulse width. The duty cycle or pulse width of the switched DC signal is controlled via feedback techniques to generate a selected output current.

As described above, Equation (1) defines the relationship between the PFC circuit output voltage ($V_{PFC\_OUT}$) and the sensed voltage ($V_{SENSE}$). As further discussed above, the PFC IC 200 operates to maintain the sensed voltage at approximately 2.5 volts. Accordingly, the average magnitude ($V_{PFC\_OUT\_AVG}$) of the PFC circuit output voltage can be expressed by rearranging Equation (1) and substituting 2.5 volts for the sensed voltage as follows:

$$V_{PFC\_OUT\_AVG} = 2.5 \times \frac{R1 + R2}{R2} \qquad (2)$$

Figure 2:
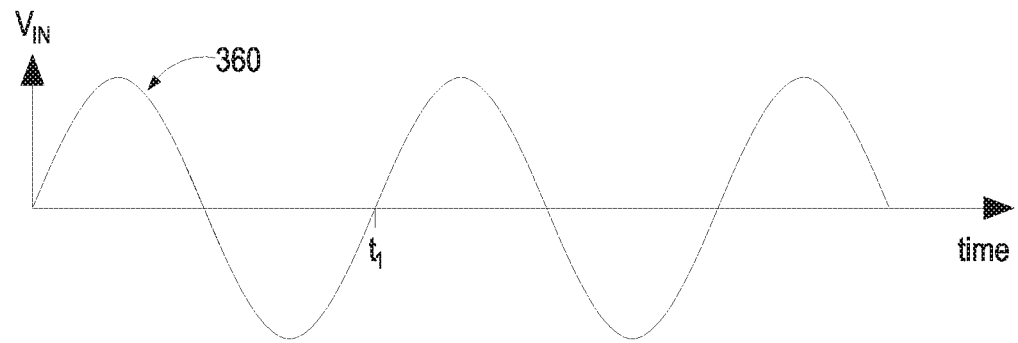
FIG. 2 illustrates a waveform of an AC input voltage ($V_{IN}$) from the AC source of FIG. 1.
Figure 3:
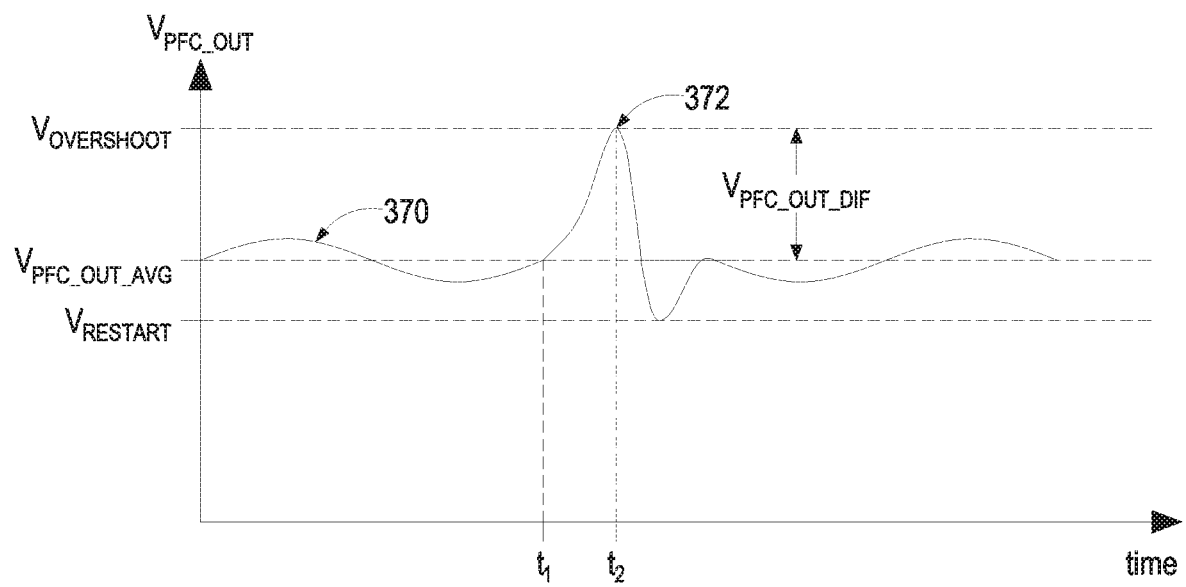
FIG. 3 illustrates a waveform of output voltage ($V_{PFC\_OUT}$) from the power factor correction circuit of FIG. 1.

In addition to sensing the sensed voltage ($V_{SENSE}$) at the voltage sensing node 316 to control the PFC circuit output voltage ($V_{PFC\_OUT}$), the PFC IC 200 also detects an overvoltage condition. An overvoltage condition may occur, for example, when the current through the load 118 decreases suddenly. The overvoltage is illustrated for example in FIGS. 2 and 3. A first voltage waveform 360 in FIG. 2 illustrates the AC input voltage ($V_{IN}$) from the AC source 120. A second voltage waveform 370 in FIG. 3 illustrates the PFC circuit output voltage ($V_{PFC\_OUT}$). As illustrated by the initial portion of the second voltage waveform in FIG. 3, the normal PFC circuit output voltage has an average value ($V_{PFC\_OUT\_AVG}$) with a small magnitude ripple about the average value at a frequency corresponding to the frequency of the AC input voltage.

At a time $t_1$, the PFC circuit output voltage (second voltage waveform 370 in FIG. 3) experiences an overvoltage condition (also referred to as an overshoot) such as may be caused by a sudden decrease in the current through the load 118. The PFC circuit output voltage increases rapidly to a peak voltage 372 at a greater voltage magnitude. The greater voltage magnitude is identified as $V_{OVERSHOOT}$ on the second waveform 370. During the initial portion of the overshoot condition, the PFC IC 200 will continue to switch the electronic switch 280 on and off to pump energy into the PFC circuit output filter capacitor 302. The PFC IC continues to drive the electronic switch until the magnitude of the PFC circuit output voltage ($V_{PFC\_OUT}$) reaches the magnitude $V_{OVERSHOOT}$. The overshoot voltage ($V_{OVERSHOOT}$) is greater than the average PFC output voltage ($V_{PFC\_OUT\_AVG}$) by a voltage difference ($\Delta V_{RFC\_OUT\_DIF}$). The rapidly changing voltage difference causes a rapid increase in current through the first voltage sensing resistor 312. The current is coupled into the PFC IC via the compensation capacitor 330. When the coupled current is sufficiently high (e.g., 40 microamperes), the PFC IC turns off the gate drive signal from the gate driver (GD) output 216 at a time t2 to stop the electronic switch from switching. After turning off the gate drive signal, the PFC IC maintains the gate drive signal in the off condition until the magnitude of the coupled current falls below a certain magnitude (e.g., 10 microamperes). When the output current falls below the certain magnitude, the PFC IC again activates the gate drive signal to the electronic switch. In the second waveform of FIG. 3, the PFC output voltage decreases to a voltage $V_{RESTART}$ while the gate drive signal is off. When the restart voltage is reached, the PFC IC resumes applying the gate drive signal to the electronic switch.

For the illustrated PFC IC, the magnitude of the coupled current that causes the PFC IC to turn off the gate drive signal is approximately 40 microamperes (40 µA). Accordingly, the magnitude of the voltage difference ($\Delta V_{PFC\_OUT\_DIF}$) that causes the PFC IC to turn of the gate drive signal can be calculated as:

$$\Delta V_{PFC\_OUT\_DIF} = 40 \times 10^{-6} \times R1 \quad (3)$$

As shown by Equation (3), the voltage difference required to trigger the overvoltage response of the PFC IC 200 is selected by selecting the resistance R1 of the first voltage sensing resistor 312. The voltage difference is selected to be greater than a peak normal steady-state magnitude of the PFC circuit output voltage so that the overvoltage shutdown does not occur during normal steady-state operating conditions. In the embodiment of FIG. 1, the resistance R1 of the first voltage sensing resistor is selected to be approximately 1,000,000 ohms (1 MΩ) such the overvoltage protection is triggered at approximately 40 volts of overshoot when the current applied to the compensation (COMP) input 204 of the PFC IC increases to 40 microamperes.

After selecting the resistance of the first voltage sensing resistor in accordance with Equation (3), the resistance R2 of the second voltage sensing resistor 314 is selected in accordance with Equation (2) to select the magnitude of the PFC circuit output voltage ($V_{PFC\_OUT}$). For example, in one embodiment, where the desired PFC circuit output voltage is 460 volts and the resistance R1 of the first voltage sensing resistor 312 is approximately 1 MΩ, the resistance R2 of the second voltage sensing resistor is approximately 5,460 ohms (5.46 kΩ) such that the steady-state magnitude of the voltage at the voltage sensing node 316 and the inverting (INV) input 202 of the PFC IC 200 is 2.5 volts.

The PFC circuit output filter capacitor 302 has a voltage rating ($V_{RATING\_C}$) selected to accommodate the nominal (average) PFC circuit output voltage ($V_{PFC\_OUT\_AVG}$) plus the maximum overshoot voltage difference ($\Delta V_{PFC\_OUT\_DIF}$) as follows:

$$V_{RATING\_C} = V_{PFC\_OUT\_AVG} + \Delta V_{PFC\_OUT\_DIF} \quad (4)$$

For an average power factor circuit output voltage of 460 volts and a maximum overshoot voltage of 40 volts, the PFC circuit output filter capacitor 302 has a voltage rating of at least 500 volts.

As discussed above, the low voltage source 226 can be shut down in response to activation of the "standby" signal to discontinue providing a supply voltage to the VCC input 220 of the PFC IC 200 and to the component supply voltage terminal 344 of the DC-DC converter 116. Placing the PFC IC and the DC-DC converter in standby mode substantially reduces the power consumption from the AC source 120 when no current is required for the load 118 (e.g., when an LED load turned off to cease generating illumination).

In the standby mode, the PFC IC 200 stops generating the gate drive signal to the electronic switch 280. Accordingly, the voltage developed across the PFC circuit output filter capacitor 302 will have the magnitude of the peak magnitude of the AC input voltage from the AC source 120. The voltage across the PFC circuit output filter capacitor is applied across the series combination of the first voltage sensing resistor 312 and the second voltage sensing resistor 314. The resistance of the first voltage sensing resistor is much greater than the resistance of the second voltage sensing resistor such that substantially all of the capacitor voltage is applied across the first voltage sensing resistor. Accordingly, the standby power consumption ($P_{R1\_STANDBY}$) of the first voltage sensing resistor is calculated as a function of the RMS value of the AC input voltage ($V_{IN\_RMS}$) as:

$$P_{R1\_STANDBY} = \frac{(\sqrt{2} \times V_{IN\_RMS})^2}{R1} \quad (5)$$

In one embodiment, the resistance R1 of the first voltage sensing resistor 312 is 1,000,000 ohms (1 MΩ), which results in a maximum overshoot ($V_{PFC\_OUT\_DIF}$) of 40 volts. When the AC input voltage is 277 volts, the power dissipated in the first voltage sensing resistor is approximately 0.153 watt (153 milliwatts).

In one embodiment, the maximum allowable standby power for the two-stage electronic switching power supply 100 is approximately 0.5 Watt (500 milliwatts). Accordingly, the power dissipated in the first voltage sensing resistor 312 is slightly less than one-third of the allowable standby power. Reducing the power dissipation in the first voltage sensing resistor is desirable; however, the reduction in power dissipation should be accomplished while maintaining a reasonable overvoltage protection voltage.

An apparently simple modification to the two-stage electronic switching power supply 100 of FIG. 1 to reduce power dissipation in the first voltage sensing resistor 312 is to increase the resistance R1 of the first voltage sensing resistor. According to Equation (5), the increased resistance decreases the power dissipation in the first voltage sensing resistor. For example, doubling the resistance of the first voltage sensing resistor reduces the power dissipation in the first voltage sensing resistor by 50 percent. However, increasing the resistance of the first voltage sensing resistor also increases the overvoltage protection threshold. As shown in Equation (3), the increase in voltage ($\Delta V_{PFC\_OUT\_DIF}$) required to activate the overvoltage protection within the PFC IC 200 is directly proportional to the resistance R1 of the first voltage sensing resistor. If the resistance of the first voltage sensing resistor is increased, the transient peak voltage applied to the PFC circuit output filter capacitor 302 will increase. If the increase is sufficiently great, the voltage rating of the PFC circuit output filter capacitor may have to be increase, which may require a more expensive electrolytic capacitor.

As an example of the foregoing, if the two-stage electronic switching power supply 100 is initially designed to have an average PFC circuit output voltage ($V_{PFC\_OUT\_AVG}$) of 460 volts and the overvoltage protection is set to voltage differential ($\Delta V_{PFC\_OUT\_DIF}$) of 40 volts, the voltage rating for the PFC circuit output filter capacitor 302 is 500 volts. If the resistance R1 of the first voltage sensing resistor 312 is doubled to decrease the standby power dissipation by one-half, as suggested above, the voltage differential ($\Delta V_{PFC\_OUT\_DIF}$) corresponding to the overvoltage protection will double to 80 volts. The additional 40 volts causes the maximum output voltage applied to the PFC circuit output filter capacitor to be 540 volts for the same average PFC circuit output voltage. Accordingly, the 500-volt rated PFC circuit output filter capacitor must be replaced with a capacitor with a higher voltage rating. The next higher rated standard electrolytic capacitor has a 700-volt rating. A higher-rated capacitor is more expensive. The higher-rated capacitor also occupies a larger volume (e.g., has a larger diameter, is taller, or is both taller and larger in diameter) than the 500-volt rated capacitor. This solution to reducing the power dissipation in the first voltage sensing resistor is not desirable.

Figure 4:
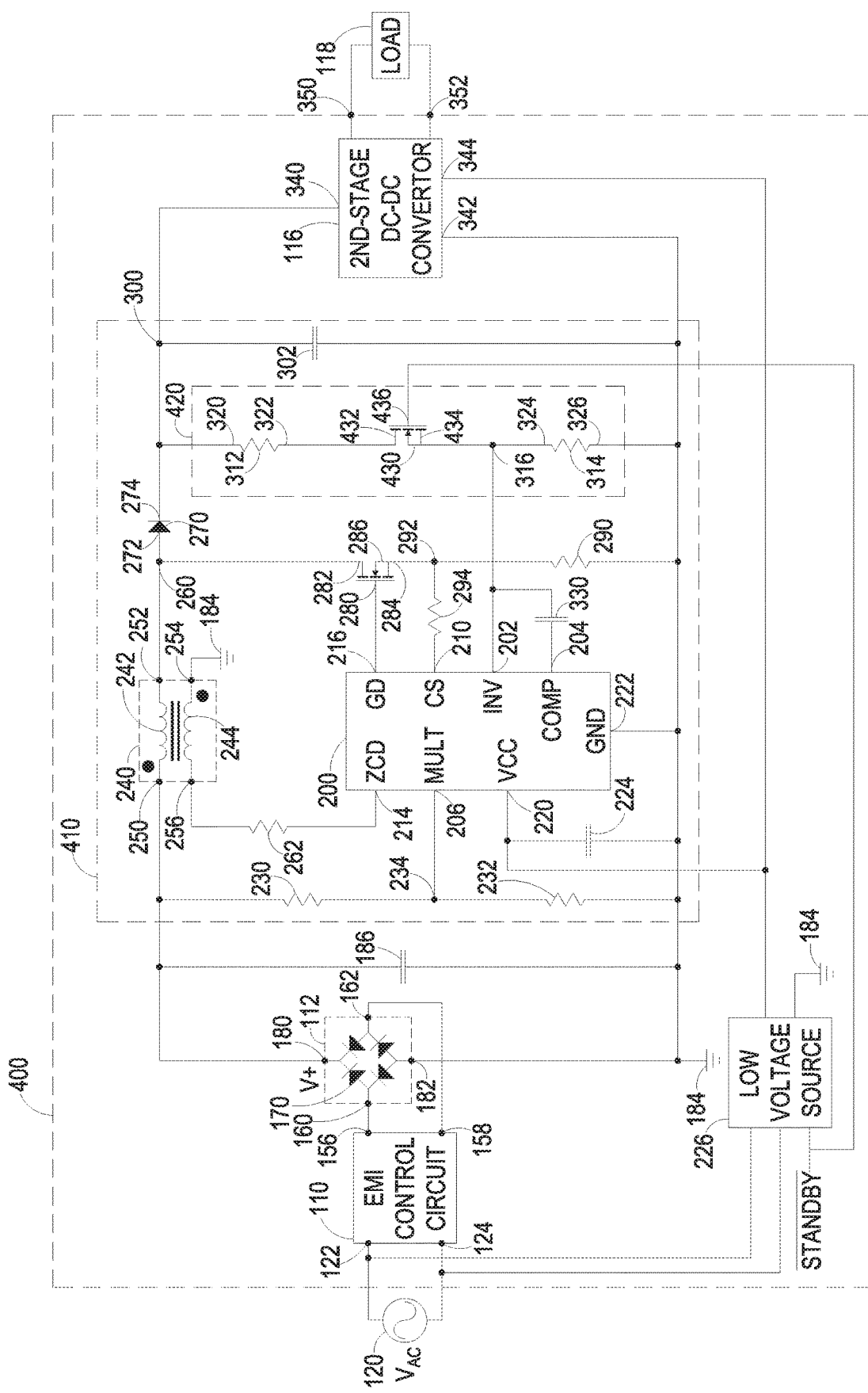
FIG. 4 illustrates a modified version of the two-stage electronic switching power supply of FIG. 1 in which a voltage sensing circuit within the power factor correction circuit is modified to include an electronic switch to disconnect the first voltage sensing resistor from the voltage sensing node when the electronic switching power supply is in a standby mode.

FIG. 4 illustrates another modification to the two-stage electronic switching power supply 100 to reduce the power dissipation in the first voltage sensing resistor 312. A two-stage electronic switching power supply 400 in FIG. 4 has components corresponding to the previously described components and like elements are numbered accordingly. Unlike the two-stage electronic switching power supply of FIG. 1, the two-stage electronic switching power supply of FIG. 4 includes a modified PFC circuit 410 that replaces the PFC circuit 114 of FIG. 1. In particular, the modified PFC circuit of FIG. 4 includes a modified voltage sensing circuit 420. The modified voltage sensing circuit of FIG. 4 is similar to the previously described voltage sensing circuit 310 of FIG. 1. The modified voltage sensing circuit includes the first voltage sensing resistor 312, the second voltage sensing resistor 314 and the voltage sensing node 316 as described above. However, in the modified voltage sensing circuit of FIG. 4, the second terminal 322 of the first voltage sensing resistor is not connected directly to the voltage sensing node as in FIG. 1. Rather, an electronic switch 430 (referred to herein as a voltage sensing circuit switch 430) is interposed between the first voltage sensing resistor and the voltage sensing node 316 in the voltage sensing circuit 410.

In the illustrated embodiment, the voltage sensing circuit switch 430 is a MOSFET, which may be similar to the MOSFET that implements the electronic switch 280. The voltage sensing circuit switch has a drain terminal 432 connected to the second terminal 322 of the first voltage sensing resistor 312 and has a source terminal 434 connected to the voltage sensing node 316. The voltage sensing circuit switch has a gate terminal 436 that is controlled by the standby signal that controls the low voltage source 226. When the standby signal is inactive (e.g., a high voltage), the voltage sensing circuit switch is turned on with a very low drain-to-source resistance such that the first voltage sensing resistor is connected to the voltage sensing node as described above. When the standby signal is active (e.g., a low voltage), the voltage sensing circuit switch is turned off such that the first voltage sensing resistor is effectively disconnected from the voltage sensing node.

The voltage sensing circuit switch 420 in the PFC circuit 410 of the two-stage electronic switching power supply 400 in FIG. 4 operates to effectively electrically disconnect the voltage sensing circuit 420 from the PFC circuit output node 300 when the standby signal is active (e.g., at a low voltage level). Accordingly, the first voltage sensing resistor 312 does not dissipate any power when the two-stage electronic switching power supply is in the standby mode.

Although the modified voltage sensing circuit 420 of FIG. 4 is effective to reduce (e.g., eliminate) the power dissipation in the first voltage sensing resistor 312, the voltage sensing circuit switch 430 may be sensitive to electrical noise in the two-stage electronic switching power supply 400. In particular, the standby signal may have noise superimposed thereon when the standby signal is inactive high and the voltage sensing circuit switch is on. The noise on the inactive standby signal applied to the gate terminal 436 of the voltage sensing circuit switch 430 may cause variations in the voltage (e.g., noise) across the second voltage sensing resistor 314 at the voltage sensing node 316. The noise may be injected into the inverting (INV) input 202 of the PFC IC 200 and thus into the voltage control loop of the PFC IC. The injected noise could cause undesirable instability in the output voltage at the PFC circuit output node 300. Furthermore, the voltage sensing circuit switch must be rated at a high voltage (e.g., at least 500 volts), which is very expensive. The solution provided by the two-stage electronic switching power supply 400 illustrated in FIG. 4 is potentially unstable and is costly and is therefore not a preferred solution for reducing power dissipation in the standby mode.

FIG. 5 illustrates an improved two-stage electronic switching power supply 500 that decreases the power dissipation in a standby mode while maintaining a reasonably small magnitude for the output voltage difference ($\Delta V_{PFC\_OUT\_DIF}$) that triggers an overvoltage condition. The improved two-stage electronic switching power supply of FIG. 5 is similar to the previously described two-stage electronic switching power supply 100 of FIG. 1 and like elements are numbered the same as in FIG. 1. Unlike the previously described two-stage electronic switching power supply of FIG. 1, the improved two-stage electronic switching power supply of FIG. 5 includes an improved PFC circuit 510, which include an improved voltage sensing circuit 520.

In the improved voltage sensing circuit 520 of FIG. 5, the second terminal 322 of the first voltage sensing resistor 312 is not connected directly to the voltage sensing node 316. Instead, the second terminal of the first voltage sensing resistor is connected to a first terminal 532 of a third voltage sensing resistor 530. A second terminal 534 of the third voltage sensing resistor is connected to the voltage sensing node. Accordingly, the first voltage sensing resistor, the second voltage sensing resistor 314 and the third voltage sensing resistor are connected in series between the PFC circuit output node 300 and the local circuit ground connection 184.

The series resistance of the first voltage sensing resistor 312 and the third voltage sensing resistor 530 between the PFC circuit output node 300 and the voltage sensing node 316 determines the standby power dissipation in the voltage sensing circuit 310. For example, in one embodiment, a resistance R3 of the third voltage sensing resistor is selected to be twice the resistance R1 of the first voltage sensing resistor such that the series resistance of the two resistors is three times the resistance R2 of the second voltage sensing resistor. Therefore, in accordance with Equation (5), the standby power dissipation in the two resistors is approximately one-third of the power dissipation of the first voltage sensing resistor in the embodiment of FIG. 1.

Just adding the third voltage sensing resistor 530 to the improved two-stage electronic switching power supply 500 of FIG. 5 would have the same issue with an increased threshold for overvoltage protection as described above for simply increasing the resistance of the first voltage sensing resistor 312. However, the embodiment of FIG. 5 further includes a stabilization capacitor 540 having a capacitance C1 connected across the third voltage sensing resistor such that the stabilization capacitor is in parallel to the third voltage sensing resistor. A first terminal 542 of the stabilization capacitor is connected to the first terminal 532 of the third voltage sensing resistor, and a second terminal 544 of the stabilization capacitor is connected to the second terminal 534 of the third voltage sensing resistor. The stabilization capacitor stabilizes the voltage across the third voltage sensing resistor when voltage transients occur as described below.

The capacitance C1 of the stabilization capacitor 540 is selected such that a charging constant of the first voltage sensing resistor 312 and the stabilization capacitor is greater than two cycles of the AC line voltage (e.g., greater than 33.3 milliseconds). Accordingly, the voltage across the stabilization capacitor is maintained at a substantially constant magnitude during normal operating conditions.

A second voltage waveform 370 in FIG. 3 illustrates the PFC circuit output voltage ($V_{PFC\_OUT}$). FIG. 6 illustrates a waveform 550 of the PFC circuit output voltage ($V_{PFC\_OUT}$) of the power factor correction circuit 510 of FIG. 5. The voltage waveform in FIG. 6 generally corresponds to the waveform 370 of FIG. 3. The voltage waveform in FIG. 6 includes a peak voltage 552 at a time $t_1$ as previously described.

FIG. 7 illustrates a voltage $V_{R1}$, which appears across the first voltage sensing resistor 312. The voltage $V_{R1}$ is represented by a waveform 560. During normal operating conditions, the voltage $V_{R1}$ appears as a low-frequency (e.g., 60 Hz) ripple about an average voltage ($V_{R1}$_AVG). A corresponding ripple voltage ($V_{C\_STABILAZATION}$) appears across the stabilization capacitor 540 as represented by a waveform 570 in FIG. 8. The voltage across the stabilization capacitor has an average voltage of $V_{C\_STAB\_AVG}$.

When a transient ($V_{PFC\_OUT\_DIF}$) occurs in the PFC circuit output voltage ($V_{PFC\_OUT}$) at a time $t_1$ as illustrated by the peak voltage 552 in the waveform 550 in FIG. 6, the voltage across the stabilization capacitor 540 cannot change instantaneously. The voltage across the third voltage sensing resistor 530 also cannot change instantaneously. As shown in FIG. 7, the transient voltage of FIG. 6 (e.g., the peak voltage 552) causes a corresponding peak voltage 562 in the voltage waveform 560 of the voltage $V_{R1}$ across the first voltage sensing resistor 312. With the selected capacitance of the stabilization capacitor 540, the low-frequency voltage across the stabilization capacitor can be approximated as not changing during a short transit of less than one-half of a cycle of the AC line voltage (e.g., less than approximately 8.3 milliseconds. Accordingly, the transient overshoot voltage appears only across the first voltage sensing resistor as shown in FIG. 7. The voltage $V_{C\_STABILIZATION}$ across the stabilization capacitor and across the third resistor continues to track the ripple caused by the AC line voltage about the average stabilization capacitor voltage ($V_{C\_STAB\_AVG}$) as shown in FIG. 8. As a result, only the resistance R1 of the first voltage sensing resistor determines the overvoltage protection threshold in accordance with Equation (3). The resistance R1 of the first voltage sensing resistor remains the same as in the embodiment of FIG. 1. Thus, the overvoltage threshold remains at an acceptable 40 volts as previously described although the standby power dissipation of FIG. 5 is reduced to one-third the previous power dissipation of the embodiment of FIG. 1.

The component values of the improved two-stage electronic switching power supply 500 of FIG. 5 can be determined in accordance with the following method.

The resistance R1 of the first voltage sensing resistor 312 is selected in accordance with a desired maximum overshoot voltage and the magnitude of the current into the inverting (INV) input 202 of the PFC IC 200 that triggers overvoltage protection. For the L6561 IC from STMicroelectronics, the magnitude of the current triggering the overvoltage protection is 40 microamperes. For an overvoltage protection of 40 volts, the resistance R1 of the first voltage stabilization resistor is selected to be 1,000,000 ohms (1 MΩ). The resistance can be decreased for a smaller overvoltage value and increased for a larger overvoltage value.

After selecting the resistance R1 of the first voltage sensing resistor 312, a desired standby power dissipation in the voltage sensing circuit is determined. For example, in the illustrated embodiment, a standby power dissipation of approximately 0.05 watt (50 milliwatts) is selected.

A total resistance $R_{SERIES}$ of the series resistance between the PFC circuit output node 300 and the voltage sensing node 316 is determined by rewriting Equation (5) and substituting the total resistance of the first voltage sensing resistor 312 and the third voltage sensing resistor 510 for the resistance of the first voltage sensing resistor as follows:

$$R_{SERIES} = \frac{\left(\sqrt{2} \times V_{IN\_RMS}\right)^2}{P_{R1\_STANDBY}} = \frac{2 \times (V_{IN\_RMS})^2}{P_{R1\_STANDBY}} \quad (6)$$

The resistance R3 of the third voltage sensing resistor 530 is determined by subtracting the resistance R1 of the first voltage sensing resistor 312 from the total series resistance $R_{SERIES}$ found using Equation (6) (i.e., R3=$R_{SERIES}$−R1). In the illustrated embodiment, for a desired standby power dissipation of approximately 0.05 watt (approximately 50 milliwatts), the series resistance $R_{SERIES}$ is calculated as 3,000,000 ohms (3 MΩ). Subtracting the resistance R1 of 1,000,000 ohms (1 MΩ) from the series resistance results in a resistance value of 2,000,000 ohms (2 MΩ) for the resistance R3 of the third voltage sensing resistor.

With the resistance R3 of the third voltage sensing resistor 530 in series with the resistance R1 of the first voltage sensing resistor 312, Equation (5) is modified to determine the dissipated standby power as follows:

$$P_{STANDBY} = \frac{\left(\sqrt{2} \times V_{IN\_RMS}\right)^2}{R1 + R3} \quad (5)$$

In the illustrated embodiment where the resistance R1 of the first voltage sensing resistor 312 is 1,000,000 ohms and the resistance of the third voltage sensing resistor 530 is 2,000,000 ohms, the standby power dissipated by the embodiment of FIG. 5 is approximately ⅓ the power dissipated by the embodiment of FIG. 1.

The resistance R2 of the second voltage sensing resistor 314 is then determined by substituting $R_{SERIES}$ from Equation (6) for the resistance R1 of the first voltage sensing resistor 312 in Equation (2) as follows:

$$V_{PFC\_OUT\_AVG} = 2.5 \times \frac{R_{SERIES} + R2}{R2} = 2.5 \times \frac{R1 + R3 + R2}{R2} \quad (8)$$

Rearranging Equation (8) results in the following:

$$R2 \times (V_{PFC\_OUT\_AVG} - 2.5) = 2.5 \times R_{SERIES} \quad (9)$$

Substituting an average PFC output voltage of 460 volts and a series resistance of 3,000,000 ohms (3 MΩ) into Equation (9) results in a value of approximately 16,393 ohms (approximately 16.4 kΩ) for the resistance R2 of the second voltage sensing resistor 314.

The capacitance C1 for the stabilization capacitor 540 is determined by selecting the capacitance such that the charge time (e.g., the RC time constant) of the capacitance C1 and the resistance R1 of the first voltage sensing resistor 312 is greater than the total period of two cycles of the AC line voltage. This relationship can be expressed as follows wherein $f_{LINE}$ is the frequency of the AC line voltage (e.g., 60 Hz in the United States):

$$C1 \times R1 > 2/f_{LINE} \quad (10)$$

Substituting 1 MΩ for the resistance R1 and substituting 60 Hz for $f_{LINE}$ in Equation (10) results in a value of approximately 33 nanofarads ($33 \times 10^{-9}$ farads) for the capacitance C1 of the stabilization capacitor 540.

The method described herein results in the selection of component values that maintain an acceptably low overshoot voltage while substantially reducing the power dissipation in the voltage sensing circuit.

As described above, the improved two-stage electronic switching power supply 500 operates in at least three modes. In a normal mode of operation, the improved voltage sensing circuit 520 is automatically configured such that the first voltage sensing resistor 312, the second voltage sensing resistor 314 and the third voltage sensing resistor 530 are connected in series between the PFC circuit output node 300 and the local circuit ground connection 184. The voltage on the voltage sensing node is proportional to the output voltage on PFC circuit output node in accordance with Equation (7). As discussed above, during the normal mode of operation, the PFC circuit 510 maintains the output voltage at a substantially constant average magnitude (e.g., 460 volts) such that the voltage on the voltage sensing node 316 is maintained at 2.5 volts.

In the transient mode of operation, a rapidly changing overshoot voltage is coupled via the stabilization capacitor 540 to effectively bypass the third voltage sensing resistor 530. Thus, the voltage on the voltage sensing node 316 is determined only by the first voltage sensing resistor 312 and the second voltage sensing resistor 314 in accordance with Equation (1). Thus, the rapidly changing overshoot voltage results in the voltage on the voltage sensing node increasing above 2.5 volts at a lower output voltage than if the third voltage sensing resistor were not bypassed by the stabilization capacitor. The PFC circuit 510 detects the overvoltage condition at a lower output voltage such that the output voltage does not exceed 500 volts before the power factor correction circuit turns off. As discussed above, this prevents the output voltage from exceeding the rated voltage of the PFC circuit output filter capacitor 302.

In a standby mode of operation in which the PFC circuit 510 does not switch the electronic switch 280, the voltage on the output node 300 tracks the AC input voltage. The first voltage sensing resistor 312, the second voltage sensing resistor 314 and the third voltage sensing resistor 530 dissipate power in the standby mode as determined primarily by the much larger resistances (R1 and R3) of the first voltage sensing resistor and the third voltage sensing resistor in accordance with Equation (7). Thus, the power dissipation in the standby mode of the embodiment of FIG. 5 is substantially reduced in the standby mode (e.g., reduced to one-third of the power dissipation of the embodiment of FIG. 1 with the described resistance values). Although the power dissipation in the standby mode is reduced, the embodiment of FIG. 5 retains the low overvoltage threshold of the embodiment of FIG. 1 without introducing an additional electronic switch, such as the electronic switch 430 of FIG. 4, which has the potential noise issues discussed above.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A voltage feedback circuit for a power factor correction circuit, the power factor correction circuit having a voltage feedback input terminal connected to an overvoltage detection circuit, the power factor correction circuit producing an output voltage on an output node, the output voltage referenced to a voltage reference node, the voltage feedback circuit comprising:
   a first voltage sensing resistor having a first terminal and a second terminal, the first terminal of the first voltage sensing resistor connected to the output node;
   a second voltage sensing resistor having a first terminal and a second terminal, the second terminal of the second voltage sensing resistor connected to the voltage reference node;
   a third voltage sensing resistor having a first terminal and a second terminal, the first terminal of the third voltage sensing resistor connected to the second terminal of the first voltage sensing resistor, the second terminal of the third voltage sensing resistor connected to the first terminal of the second voltage sensing resistor and to the voltage feedback input terminal of the power factor correction circuit; and
   a stabilization capacitor having a first terminal and a second terminal, the first terminal of the stabilization capacitor connected to the second terminal of the first voltage sensing resistor and to the first terminal of the third voltage sensing resistor, the second terminal of the stabilization capacitor connected to the second terminal of the third voltage sensing resistor and to the voltage feedback input terminal of the power factor correction circuit.

2. The voltage feedback circuit as defined in claim 1, wherein:
   the power factor control circuit maintains a voltage on the feedback input terminal at a fixed voltage;
   the first voltage sensing resistor has a first resistance, the second voltage sensing resistor has a second resistance, and the third voltage sensing resistor has a third resistance, the ratio of the value of the second resistance to the total of the first resistance, the second resistance and the third resistance selected such that the voltage on the feedback input terminal has a magnitude equal to the fixed voltage when the output voltage of the power factor correction circuit on the output node has a selected output voltage magnitude;
   the total of the first resistance and the third resistance is selected to maintain a total power dissipation of the first voltage sensing resistor and the third voltage sensing resistor at a magnitude no more than a maximum power dissipation magnitude; and the stabilization capacitor has a capacitance selected to effectively bypass the third voltage sensing resistor when a rapidly changing voltage overshoot occurs such that a current caused by the voltage overshoot is coupled from the output node to the voltage feedback terminal of the power factor correction circuit via the first voltage sensing resistor and the stabilization capacitor.

3. The voltage feedback circuit as defined in claim 2, wherein:

the resistance of the first voltage sensing resistor has a magnitude R1;

wherein the power factor correction circuit is coupled to an AC source operating at a frequency $f_{LINE}$; and the stabilization capacitor has a capacitance with a magnitude C1; and the capacitance of the stabilization capacitor is selected such that:

$$C1 \times R1 > 2/f_{LINE}.$$

4. The voltage feedback circuit as defined in claim 2, wherein:

the power factor correction circuit includes an overvoltage protection circuit, the overvoltage protection circuit responsive to the magnitude of the voltage on the voltage feedback terminal to cease operation of the power factor correction circuit when the voltage on the voltage feedback terminal exceeds an overvoltage threshold voltage; and the first resistance and the second resistance are selected to cause the voltage on the voltage feedback terminal to exceed the overvoltage threshold voltage when the output voltage exceeds a selected maximum magnitude when the rapidly changing voltage overshoot occurs.

5. A method for providing a feedback voltage in a power factor correction circuit, the power factor correction circuit having a voltage output node, a ground reference and a voltage feedback input terminal, the method comprising:

connecting a first voltage sensing resistor, a second voltage sensing resistor and a third voltage sensing resistor in series between the voltage output node and the ground reference of the power factor correction circuit, wherein connecting the first, second and third voltage sensing resistors in series comprises:

connecting the first voltage sensing resistor between the voltage output node and the third voltage sensing resistor;

connecting the third voltage sensing resistor between the first voltage sensing resistor and a voltage sensing node; and connecting the second voltage sensing resistor between the voltage sensing node and the ground reference;

connecting the voltage sensing node to the voltage feedback input of the power factor correction circuit; and connecting a stabilization capacitor across the third voltage sensing resistor between the first voltage sensing resistor and the voltage sensing node.

6. The method as defined in claim 5, wherein:

the first, second and third voltage sensing resistors and the stabilization capacitor comprise a voltage sensing circuit:

in a normal mode of operation in which the power factor correction circuit actively controls an output voltage ($V_{OUT}$) on the voltage output node, a sensed voltage ($V_{SENSE}$) on the voltage sensing node is determined by the output voltage ($V_{OUT}$), by a first resistance (R1) of the first voltage sensing resistor, by a second resistance (R2) of the second voltage sensing resistor and by a third resistance (R3) of the third voltage sensing resistor in accordance with the following relationship:

$$V_{SENSE} = V_{OUT} \times \frac{R2}{R1 + R2 + R3};$$

in a transient mode of operation in which the output voltage ($V_{OUT}$) increases rapidly to an overvoltage state in response to a transient condition, the stabilization capacitor bypasses the third voltage sensing resistor such that the sensed voltage ($V_{SENSE}$) is determined by the following relationship:

$$V_{SENSE} = V_{OUT} \times \frac{R2}{R1 + R2};$$

and in the transient mode of operation, the power factor correction circuit is responsive to the sensed voltage ($V_{SENSE}$) to respond to the overvoltage of the output voltage ($V_{OUT}$) at a lower magnitude than in the normal mode of operation.

7. The method as defined in claim 6, wherein:

in a standby mode of operation in which the power factor correction circuit is not controlling the output voltage ($V_{OUT}$), the output voltage has a magnitude ($V_{RMS}$) determined by a rectified AC input voltage, and the first voltage sensing resistor and the third voltage sensing resistor dissipate power ($P_{STANDBY}$) in accordance with the following relationship:

$$P_{STANDBY} = 2 \times \frac{(V_{RMS})^2}{R1 + R3}.$$

8. The method as defined in claim 5, wherein:

the resistance of the first voltage sensing resistor has a magnitude R1;

wherein the power factor correction circuit is coupled to an AC source operating at a frequency $f_{LINE}$; and the stabilization capacitor has a capacitance with a magnitude C1; and the capacitance of the stabilization capacitor is selected such that:

$$C1 \times R1 > 2/f_{LINE}.$$

9. A method for controlling a power factor correction circuit, the power factor correction circuit having a voltage output node, a ground reference and a voltage feedback input terminal, the method comprising:

applying an output voltage ($V_{OUT}$) on the output node to a voltage sensing circuit comprising a first voltage sensing resistor, a second voltage sensing resistor, a third voltage sensing resistor and a stabilization capacitor, the voltage sensing resistor and the third voltage sensing resistor connected in series between the voltage output node and a voltage sensing node, the second voltage sensing resistor connected between the voltage sensing node and the ground reference, the stabilization capacitor connected across the third voltage sensing resistor; and developing a sensed voltage ($V_{SENSE}$) on the voltage sensing node, the sensed voltage responsive to the output voltage on the output node in two modes of operation wherein:

in a steady-state mode of operation, the sensed voltage on the voltage sensing node is responsive to a first resistance (R1) of the first voltage sensing resistor, a second resistance (R2) of the second voltage sensing resistor and a third resistance (R3) of the third voltage sensing resistor in accordance with the following:

$$V_{SENSE} = V_{OUT} \times \frac{R2}{R1 + R2 + R3};$$

and in a transient mode of operation, the stabilization capacitor couples rapid voltage changes from the first voltage sensing resistor to the voltage sensing node, and the feedback voltage on the voltage sensing node is responsive to the first resistance of the first voltage sensing resistor and the second resistance of the second voltage sensing resistor in accordance with the following:

$$V_{SENSE} = V_{OUT} \times \frac{R2}{R1 + R2}.$$

10. The method as defined in claim 9, wherein:
in a standby mode of operation in which the power factor correction circuit is not controlling the output voltage, the output voltage has a magnitude ($V_{RMS}$) determined by a rectified AC input voltage, and the first voltage sensing resistor and the third voltage sensing resistor dissipate power ($P_{STANDBY}$) in accordance with the following relationship:

$$P_{STANDBY} = 2 \times \frac{(V_{RMS})^2}{R1 + R3}.$$

11. The method as defined in claim 9, wherein:
wherein the power factor correction circuit is coupled to an AC source operating at a frequency $f_{LINE}$; and
the stabilization capacitor has a capacitance with a magnitude C1; and
the capacitance of the stabilization capacitor is selected such that:

$C1 \times R1 > 2/f_{LINE}.$

* * * * *